(12) United States Patent
Angstadt

(10) Patent No.: US 6,557,867 B1
(45) Date of Patent: May 6, 2003

(54) PORTABLE MULTI-ACTIVITY OUTDOOR RECREATION APPARATUS

(76) Inventor: Bruce L. Angstadt, 211-A Birch Hill Rd., Shoemakersville, PA (US) 19555

( * ) Notice: Subject to any disclaimer, the term of this patent is extended or adjusted under 35 U.S.C. 154(b) by 34 days.

(21) Appl. No.: 09/815,717

(22) Filed: Mar. 23, 2001

(51) Int. Cl.[7] .............................. B62B 7/12; B62B 1/00; B60N 2/32; A47B 39/00
(52) U.S. Cl. ...................... 280/30; 280/652; 297/118; 297/135
(58) Field of Search ................................ 280/8, 15, 30, 280/639, 640, 42, 648, 651, 652, 654, 659, 47.18, 47.19, 47.24, 47.25, 63, 79.11, 79.3; 297/4, 5, 16.2, 16.1, 51, 118, 119, 135, 170, 184.16, 184.11; 108/36; 182/20, 116; 224/153

(56) References Cited

U.S. PATENT DOCUMENTS

| | | | |
|---|---|---|---|
| 3,976,163 A | | 8/1976 | Watkinson |
| 4,286,739 A | * | 9/1981 | Silcott et al. ............... 224/156 |
| 4,487,428 A | * | 12/1984 | Harada et al. .............. 280/648 |
| 4,659,142 A | * | 4/1987 | Kuchinsky, Jr. ............. 297/118 |
| 4,836,938 A | * | 6/1989 | Kobassic .................... 224/155 |
| 5,056,804 A | * | 10/1991 | Wilson et al. ................ 280/30 |
| 5,213,360 A | * | 5/1993 | Lin ............................ 280/648 |
| 5,242,030 A | | 9/1993 | Lobozzo |
| 5,282,520 A | | 2/1994 | Walker |
| 5,328,192 A | | 7/1994 | Thompson |
| 5,492,255 A | | 2/1996 | Gansky et al. |
| 5,535,683 A | | 7/1996 | Novak |
| D379,261 S | | 5/1997 | Hardy |
| 5,882,070 A | * | 3/1999 | Genn ......................... 297/174 |
| 5,903,997 A | * | 5/1999 | Jacob .............................. 43/1 |
| 6,053,282 A | * | 4/2000 | Morisak .................... 182/115 |
| 6,062,446 A | * | 5/2000 | Daneau ...................... 224/154 |
| 6,095,172 A | * | 8/2000 | Trapp et al. .................. 135/96 |
| 6,196,560 B1 | * | 3/2001 | Ohlsson ....................... 280/30 |

* cited by examiner

Primary Examiner—Brian L. Johnson
Assistant Examiner—Gerald Klebe

(57) ABSTRACT

A portable multi-activity outdoor recreation apparatus for providing a person not only with an apparatus for sleeping upon but also a means for carrying downed game, an injured or sick person, and equipment. The portable multi-activity outdoor recreation apparatus comprises a frame, a supporting assembly coupled to the frame for supporting a person and game, a wheel assembly coupled to the frame, an umbrella support member removably coupled to the frame, and leg members for supporting the frame on a ground surface. The apparatus is further configurable into a seatable position and includes a seat member for supporting a user and a table member for different activities, which includes a means for a hunter to gain a steadier and longer aim when game is approaching.

20 Claims, 4 Drawing Sheets

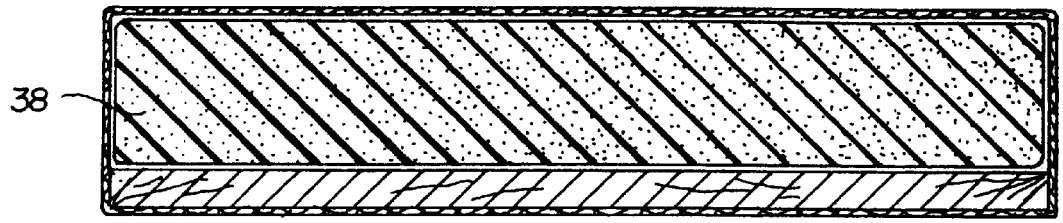
FIG 5
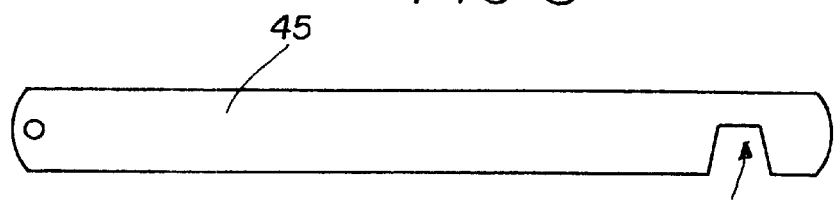
FIG. 7
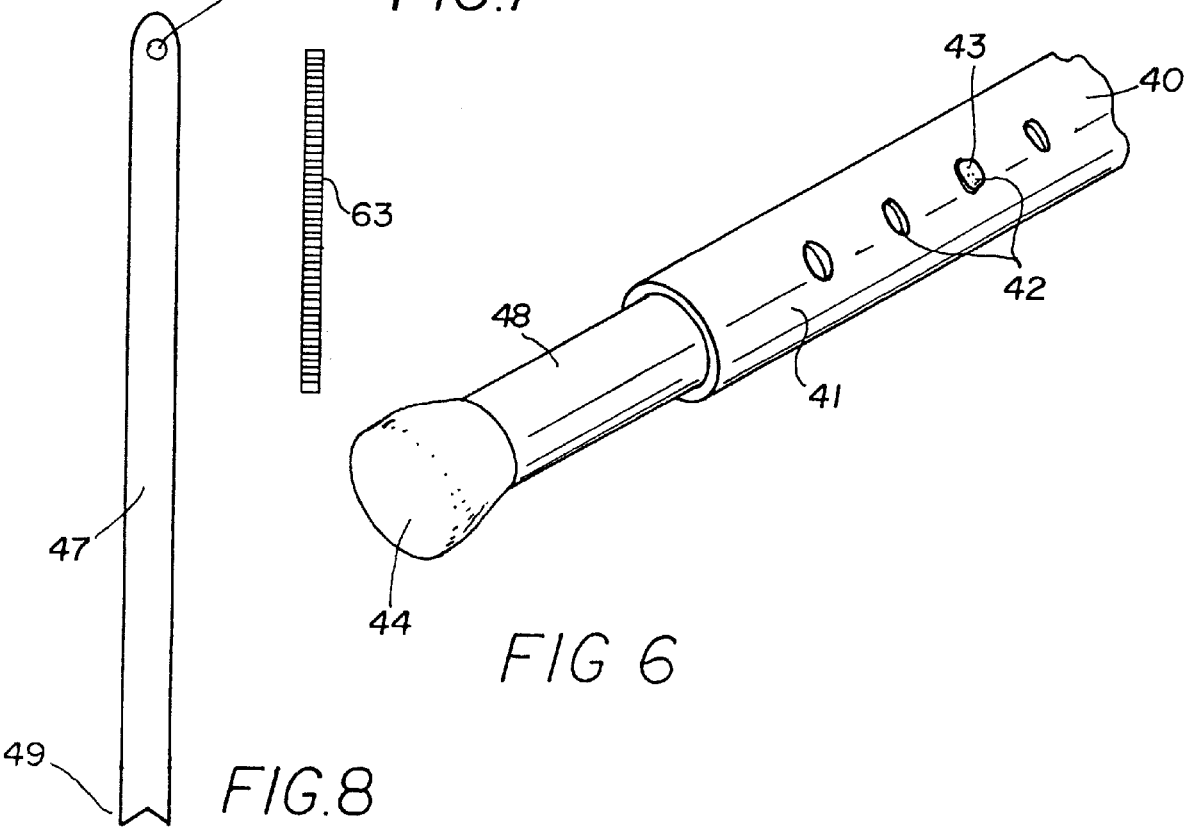
FIG 6
FIG. 8

PORTABLE MULTI-ACTIVITY OUTDOOR RECREATION APPARATUS

BACKGROUND OF THE INVENTION

1. Field of the Invention

The present invention relates to a portable outdoor activity apparatus and more particularly pertains to a new portable multi-activity outdoor recreation apparatus for providing a person with a comfortable seat with a backrest, a multi purpose table, an inclement weather attachment, a bed, and a multiple use transporting device, and can be used while hunting, camping, fishing, observing wildlife, and painting or sketching outdoor scenery.

2. Description of the Prior Art

The use of a portable multi-activity outdoor recreation apparatus is known in the prior art. More specifically, a portable outdoor activity apparatus heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes: U.S. Pat. Nos. 5,242,030; 5,328,192; 5,282,520; 5,535,683; 5,492,255; and 3,976,163.

While these devices fulfill their respective, particular objectives and requirements, the aforementioned patents do not disclose a new portable multi-activity outdoors recreation apparatus. The inventive device includes a frame having a first and second elongate base members; a first and second elongate wheel support members which are pivotally attached to the first and second elongate base members, respectfully, and further having a handle member securely attached to the first and second elongate base members, and also including a pair of cross members securely attached to the first and second elongate base members, and further including a seat member securely attached to the cross members, a backrest member, a backrest cross member securely attached to the backside of the backrest member, backrest support members securely attached to the cross members and having first curved end portions, backrest support tubular members securely attached to the backside of the backrest member and being mountable to and removable from the first curved end portions of the backrest support members and the backrest member being removably attached to the frame, a table member, a pair of bracket members securely attached to the under side of the table member and pivotally attached to the first and second elongate wheel support members, a table cross brace member securely attached to the under side of the table member, an adjustable table support member having a tubular member and shaft slidably and lockingly extended in the tubular member, bracket members being securely attached to the under side of the table member with the adjustable table support member being pivotally attached to the bracket members, an axle also mounted to the first and second elongate wheel support members, a pair of wheels mounted to the axle, a leg member pivotally attached to the first and second elongate base members, a leg member brace securely attached to the first and second elongate base members, first end portions of the first and second elongate wheel support members which extend outwardly of a bottom side of the frame when the portable multi-activity outdoor recreation apparatus is being used in the seat position, brace members being pivotally attached to the first and second elongate base members and being removably attached with fasteners and knob type handles to the first and second elongate wheel support members, a tubular umbrella support member securely attached to the backside of the backrest, an umbrella support insert member being removably placed into the tubular umbrella support member, a threaded rod being removably attached to the umbrella support insert member, adjustable strap members with buckles, and expandable straps.

In these respects, the portable recreation apparatus according to the present invention substantially departs from the conventional concepts and designs of the prior art, and in so doing provides an apparatus primarily developed for the purpose of providing hunters, campers, fishermen, wildlife observers, and artists, with a portable recreation apparatus designed for multiple uses when involved in outdoor activities.

SUMMARY OF THE INVENTION

In view of the foregoing disadvantages inherent in the known types of devices now present in the prior art, the present invention provides a new portable multi-activity outdoor recreation apparatus construction wherein the same can be utilized for providing hunters, campers, fishermen, wildlife observers, and artists with a portable recreation apparatus designed for multiple uses when involved in outdoor activities.

The general purpose of the present invention, which will be described subsequently in greater detail, is to provide a new portable multi-activity outdoor recreation apparatus which has many of the advantages of the portable outdoor activity device mentioned heretofore and many novel features that result in a new portable multi-activity outdoor recreation apparatus which is not anticipated, rendered obvious, suggested, or even implied by any of the prior art portable outdoor activity device, either alone or in any combination thereof.

To attain this, the present invention generally comprises a frame having a first and second elongate base members; a first and second elongate wheel support members which are pivotally attached to the first and second elongate base members, respectfully, and further having a handle member securely attached to the first and second elongate base members, and also including a pair of cross members securely attached to the first and second elongate base members, and further including a seat member securely attached to the cross members, a backrest member, a backrest cross member securely attached to the backside of the backrest member, backrest support members securely attached to the cross members and having first curved end portions, backrest support tubular members securely attached to the backside of the backrest member which is mountable to and removable from the first curved end portions of the backrest support members and the backrest member being removably attached to the frame, a table member, a pair of bracket members securely attached to the under side of the table member and pivotally attached to the first and second elongate wheel support members, a table cross brace member securely attached to the under side of the table member, an adjustable table support member having a tubular member and shaft slidably and lockingly extended in the tubular member, bracket members securely attached to the under side of the table member with the adjustable table support member being pivotally attached to the bracket members, an axle also mounted to the first and second elongate wheel support members, a pair of wheels mounted to the axle, a leg member pivotally attached to the first and second elongate base members, a leg member brace securely attached to the first and second elongate base members, first end portions of the first and second elongate wheel support members which extend outwardly of a bottom side of the frame when the portable multi-activity outdoor recreation apparatus is being used in a seatable position, brace members being pivotally attached to the first and second elongate base members and being removably attached with fasteners and knob type handles to the first and second elongate wheel support members, a tubular umbrella support member securely attached to the backside of the backrest, an umbrella support insert member being removably placed into the tubular umbrella support member, a threaded rod being removably attached to the umbrella support insert member, adjustable strap members with buckles, and expandable straps.

There has thus been outlined, rather broadly, the more important features of the invention in order that the detailed description thereof that follows may be better understood, and in order that the present contribution to the art may be better appreciated, there are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in the various ways. Also, it is to be understood that the phraseology and terminology employed herein are for the purpose of description and should not be regarded as limiting.

As such those skilled in the art will appreciate that the conception, upon which this disclosure is based, may readily be utilized as a basic for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by claims, nor is it intended to be limiting as to the scope of the invention in any way.

It is therefore an object of the present invention to provide a new portable multi-activity outdoor recreation apparatus which has many of the advantages of the portable outdoor activity apparatus mentioned heretofore and many novel features that result in a new portable multi-activity outdoor recreation apparatus which is not anticipated, rendered obvious, suggested, or even implied by any of the prior art portable outdoor activity apparatus, either alone or in any combination thereof.

It is another object of the present invention to provide a new portable multi-activity outdoor recreation apparatus which may be easily and efficiently manufactured and marketed.

It is a further object of the present invention to provide a new portable multi-activity outdoor recreation apparatus which is of a durable and reliable construction.

An even further object of the present invention is to provide a new portable multi-activity outdoor recreation apparatus which is susceptible of a low cost of manufacture with regard to both materials and labor, and which accordingly is then susceptible of low prices of sale to the consuming public, thereby making such portable multi-activity outdoor recreation apparatus economically available to the buying public.

Still yet another object of the present invention is to provide a new portable multi-activity outdoor recreation apparatus which provides in the apparatus and methods of the prior art some of the advantages thereof, while simultaneously overcoming some of the disadvantages normally associated therewith.

Still another object of the present invention is to provide a new portable multi-activity outdoor recreation apparatus for providing hunters, campers, fishermen, wildlife observers, and artists, with a means to enjoy outdoor activities at a much more comfortable level.

Yet another object of the present invention is to provide a new portable multi-activity outdoor recreation apparatus which includes comprises a frame having a first and second elongate base members; a first and second elongate wheel support members which are pivotally attached to the first and second elongate base members, respectfully, and further having a handle member securely attached to the first and second elongate base members, and also including a pair of cross members securely attached to the first and second elongate base members, and further including a seat member securely attached to the cross members, a backrest member, a backrest cross member securely attached to the backside of the backrest member, backrest support members securely attached to the cross members and having first curved end portions, backrest support tubular members securely attached to the backside of the backrest member which is mountable to and removable from the first curved end portions of the backrest support members and the backrest member being removably attached to the frame, a table member, a pair of bracket members securely attached to the under side of the table member and pivotally attached to the first and second elongate wheel support members, a table cross brace member securely attached to the under side of the table member, an adjustable table support member having a tubular member and shaft slidably and lockingly extended in the tubular member, a pair of bracket members securely attached to the under side of the table member with the adjustable table support member being pivotally attached to the bracket members, an axle also mounted to the first and second elongate wheel support members, a pair of wheels mounted to the axle, a leg member pivotally attached to the first and second elongate base members, a leg member brace securely attached to the first and second elongate base members, first end portions of the first and second elongate wheel support members which extend outwardly of a bottom side of the frame when the portable multi-activity outdoor recreation apparatus is being used in the seatable position, brace members being pivotally attached to the first and second elongate base members and being removably attached with fasteners and knob type handles to the first and second elongate wheel support members, a tubular umbrella support member securely attached to the backside of the backrest, an umbrella support insert member being removably placed into the tubular umbrella support member, a threaded rod being removably attached to the umbrella support insert member, adjustable strap members with buckles, and expandable straps.

Still yet another object of the present invention is to provide a new portable multi-activity outdoor recreation apparatus that is easy and convenient to assemble into a seatable position with a backrest and a table and then into a multiple use transporting position with minimal assembly and time required and also creating less noise when setting up the portable multi-activity outdoor recreation apparatus.

Even still another object of the present invention is to provide a new portable multi-activity outdoor recreation apparatus that essentially performs multiple and necessary functions for someone who hunts, camps, fishes, observes wildlife, and for someone that sketches or paints outdoor scenery. The hunter can use the portable multi-activity outdoor recreation apparatus as a comfortable seat with a backrest, an adjustable table to get a steadier and longer aim when game is approaching or to place a drink and lunch upon, and also the hunter can attach an umbrella to the apparatus when inclement weather approaches, and the hunter can also convert the portable multi-activity outdoor recreation apparatus into a wheeled transporting device for hauling equipment, downed game, or an injured hunter from an area, or to sleep upon. Basically the same uses apply to the campers, fishermen, wildlife observers and artists making it essentially more convenient while performing their outdoor activities.

These together with other objects of the invention, along with the various features of novelty which characterize the invention, are pointed out with particularity in the claims annexed to and forming a part of this disclosure. For a better understanding of the invention, its operation advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is a cross-sectional view of the seat, table, and backrest members of the present invention.

FIG. 6 is a detailed perspective view of the adjustable table support member of the present invention.

FIG. 7 is a side elevational view of one of the brace members of the present invention.

FIG. 8 is a front elevational view of the umbrella support insert member of the present invention.

DESCRIPTION OF THE PREFERRED EMBODIMENT

Figures 1, 2:
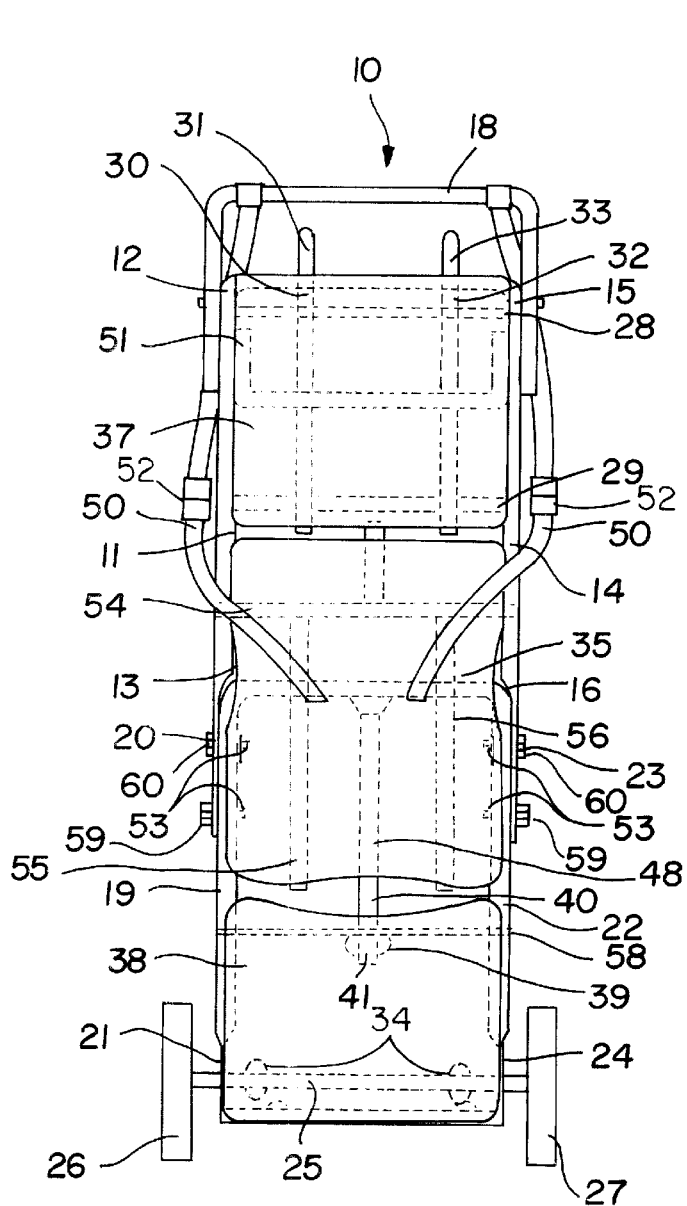
FIG. 1 is a top plain view of a new portable multi-activity outdoor recreation apparatus according to the present invention being deployed as a multiple use transporting device.
FIG. 2 is a side elevational view of the present invention being deployed as a multiple use transporting device.
Figure 3:
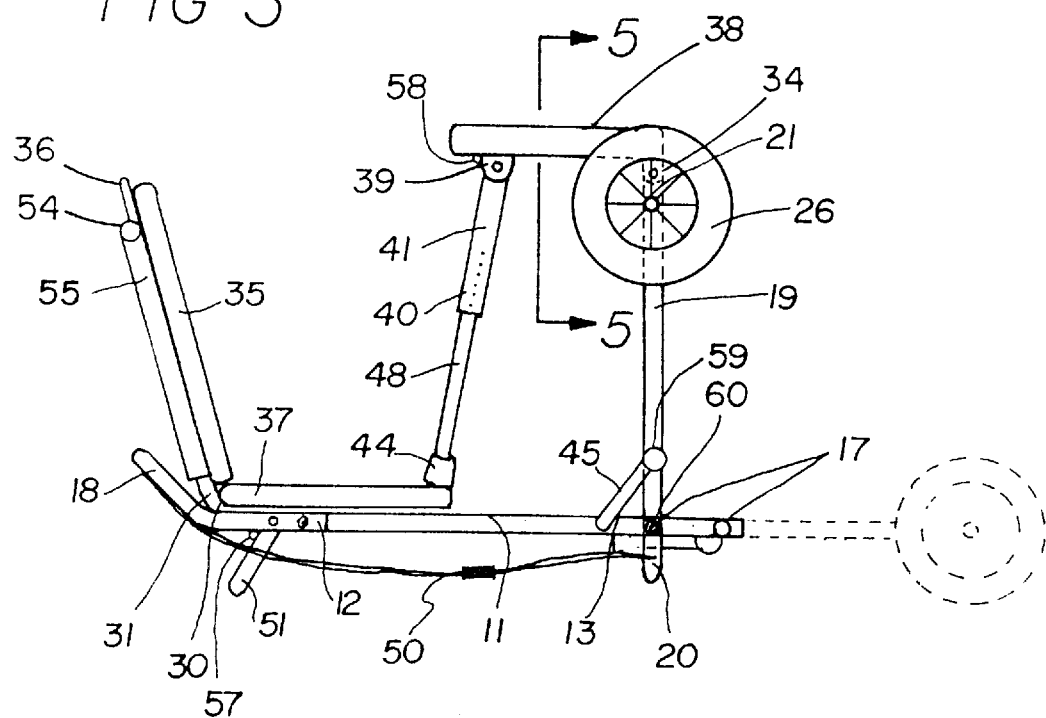
FIG. 3 is a side elevational view of the present invention being deployed as a seat with a backrest and also an adjustable table.

With reference now to the drawings, and in particular to FIGS. 1 through 9 thereof, a new portable multi-activity outdoor recreation apparatus embodying the principals and concepts of the present invention and generally designated by the reference numeral 10 will be described.

As best illustrated in FIGS. 1 through 9, the portable multi-activity outdoor recreation apparatus 10 generally comprises a frame having a top side and a bottom side, and further having first 11 and second 14 elongate base members each having a first end 12, 15 and a second end 13, 16, the first 11 and second 14 elongate base members having curved end portions at the first ends 12, 15 and becoming one continuous base member with a handle member 18 which is securely and conventionally attached at the first ends 12, 15 of the first and second elongate base members 11, 14 . The frame further includes a first and second elongate wheel support members 19, 22 each of which includes a first end portion 20, 23 and a second end 21, 24. The first and second elongate wheel support members 19, 22 having curved end portions at the first end portions 20, 23 and becoming one continuous elongate wheel support member. The frame also includes a pair of cross members 28, 29 with cross member 28 being securely attached near the first ends 12, 15 of the first and second elongate base members 11, 14 and cross member 29 being securely attached intermediate on the first and second elongate base members 11, 14. A leg member brace 57 is securely attached to the bottom side of the first and second elongate base members 11, 14 and directly underneath the cross member 28. The first end portions 20, 23 of the first and second elongate wheel support members 19, 22 being pivotally attached with fasteners 53 and knob type handles 60 to the second ends 13, 16 of the first and second elongate base members 11, 14. The first and second elongate wheel support members 19, 22 have a plurality of holes 17 at the first end portions 20, 23 and the first and second elongate base members 11, 14 have a plurality of holes 17 at the second ends 13, 16 thereof. When in the multiple use transporting position FIGS. 1 and 2 the plurality of holes 17 in the second ends 13, 16 of the first and second elongate base members 11, 14 will be in alignment with the holes 17 in the first end portions 20, 23 of the first and second elongate wheel support members 19, 22. The fasteners 53 are placed through the plurality of holes 17 and knob type handles 59, 60 are placed and tightened unto the fasteners 53 to secure the portable multi-activity outdoor recreation apparatus 10 in the multiple use transporting position. The frame includes brace members 45 with a notch 46 in a side and at an end thereof pivotally and conventionally attached to the first and second elongate base members 11, 14 and removably attached to the first and second elongate wheel support members 19, 22 using the fasteners 53 and knob type handles 59, 60 to secure the portable multi-activity outdoor recreation apparatus 10 when it is deployed in the seatable position.

Figure 4:
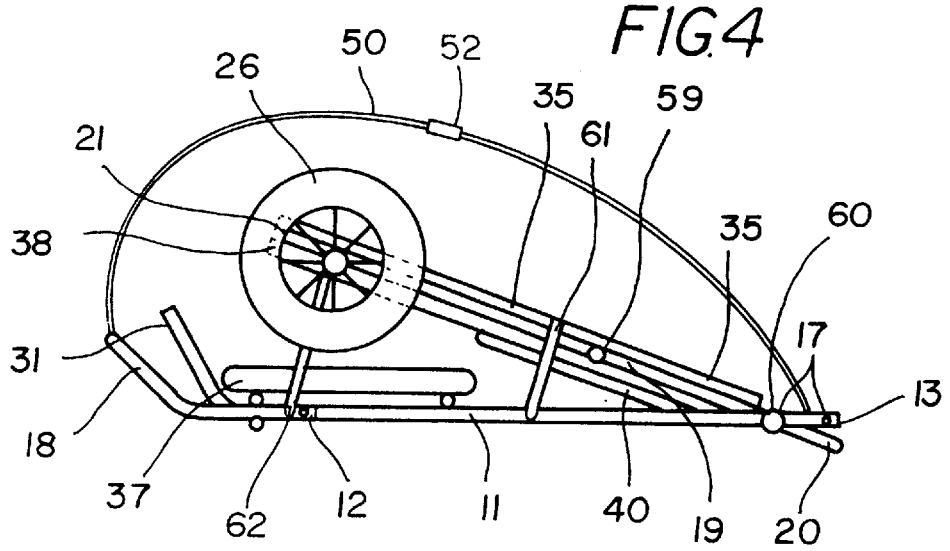
FIG. 4 is a side elevational view of the present invention being folded into a carry position.
Figure 9:
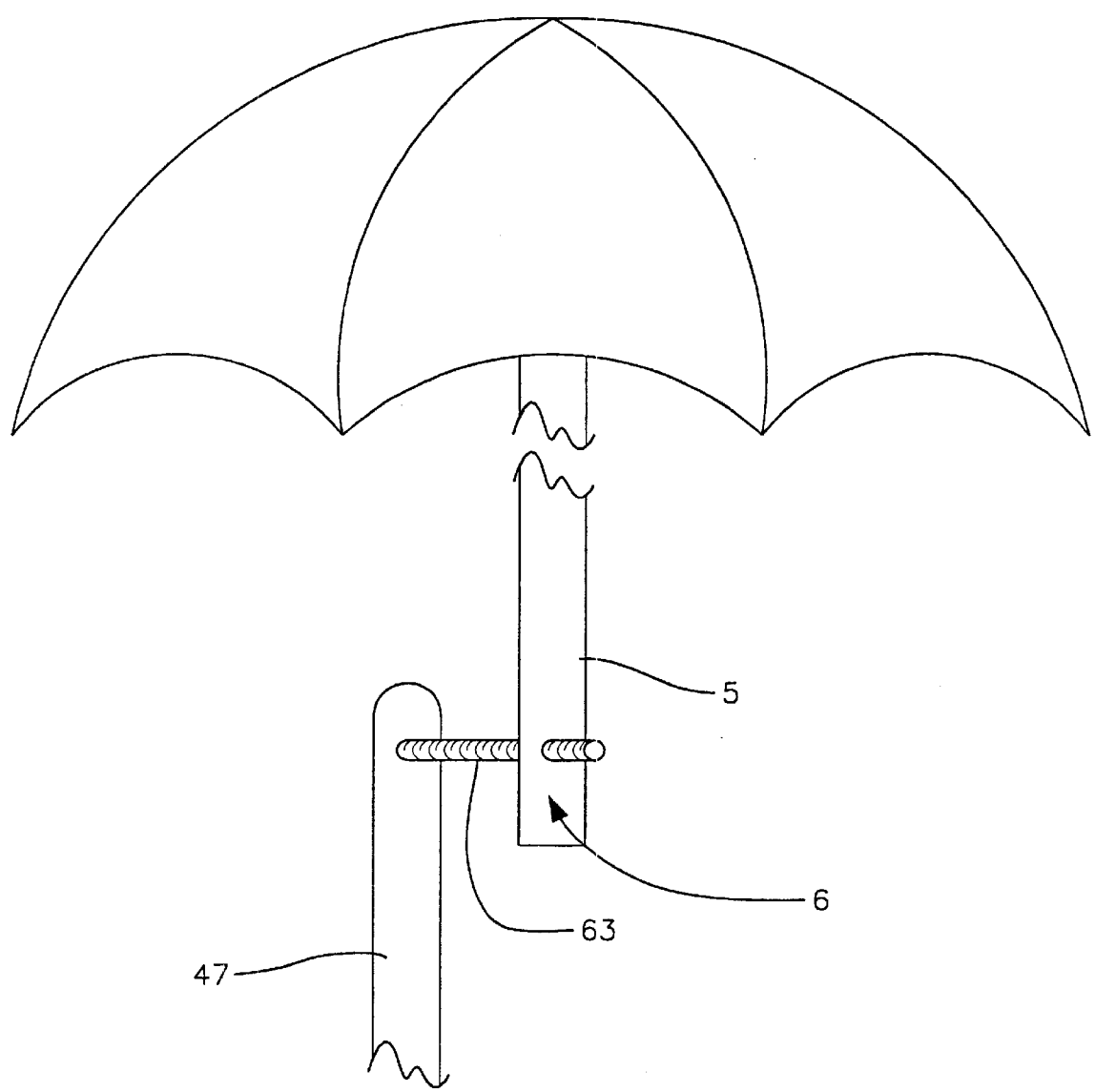
FIG. 9 is a perspective view of an umbrella supporting assembly of the present invention.

A means for supporting a person upon the portable multi-activity outdoor recreation apparatus 10 includes a seat member 37 being securely and conventionally attached to the cross members 28, 29 and includes backrest support members 30, 32 which are also securely and conventionally attached to the cross members 28, 29 and having first curved end portions 31, 33 and further includes a backrest member 35 removably mountable to the first curved end portions 31, 33 of the backrest support members 30, 32 when the portable multi-activity outdoor recreation apparatus 10 is in the seatable position and the backrest member 35 being removably attached to the frame with expandable straps 61, 62 when the portable multi-activity outdoor recreation apparatus is in the carrying position FIG. 4, and also includes a table member 38, with bracket members 34 securely and conventionally attached to the under side of the table member 38 and pivotally attached to the first and second elongate wheel support members 19, 22, and further includes an adjustable table support member 40 being pivotally attached to bracket members 39 and the bracket members 39 being securely and conventionally attached to the under side of the table member 38 and the adjustable table support member 40 being used to support the table member 38 in a generally horizontal position when the portable multi-activity outdoor recreation apparatus 10 is in a seatable position and also includes a table cross brace member 58 securely and conventionally attached to the under side of the table member 38. When in the multiple purpose transporting position the table cross brace member 58 rests on the top side of the first and second elongate wheel support members 19, 22 and also includes adjustable strap members 50 having buckles 52 with the strap members 50 securely and conventionally attached to the first and second elongate wheel support members 19, 22 and to the handle member 18 and being used to carry the portable multi activity outdoor recreation apparatus 10 or being used to secure equipment and downed game. The backrest support members 30, 32 are securely and conventionally attached to the cross members 28,29 parallel to the first and second elongate base members 11, 14. The first curved end portions 31, 33 of the backrest support members 30, 32 are proximate to the handle member 18 and extend outwardly of the top side of the frame. The seat member 37 is padded and is securely and conventionally attached to the cross members 28, 29 resting against the first curved end portions 31,33. The backrest member 35 further includes a backrest cross member 54 securely and conventionally attached to the backside of the backrest member 35, and also includes a tubular umbrella support member 36 securely and conventionally attached to the backside of the backrest member 35 and further includes backrest support tubular members 55, 56 securely and conventionally attach to the backside of the backrest member 35 thereof with the backrest support tubular members 55, 56 being adapted to removably fit about the first curved end portions 31, 33. When in the multiple use transporting position FIGS. 1 and 2 the backrest member 35 is removably attached onto the top side of the frame with expandable straps and rests between the seat member 37 and the table member 38. The table member 38 is padded and having first and second ends with bracket members 34 securely and conventionally attached to the under side of the table member 38 and at the first end thereof and the bracket members 34 being pivotally attached to the first and second elongate wheel support members 19, 22 and further the table member 38 has a table cross brace member 58 securely and conventionally attached to the under side and at the second end. When in the multiple use transporting position FIGS. 1 and 2, the table cross brace member 58 rests on the top side of the frame. The table member also includes bracket members 39 which are securely and conventionally attached to the under side and at a second end thereof. The adjustable table support member 40 includes a tubular member 41 having an open end and being pivotally attached to the bracket members 39, and further includes a shaft 48 slidably and lockingly secured in the tubular member 41 through the open end. The tubular member 41 includes a plurality of holes 42 spaced therealong and extending through a wall thereof. The shaft 48 includes a locking member 43 attached thereto and also includes a rubberized foot member 44 detachably mounted to an end of the shaft 48 with the foot member 44 being adapted to rest upon the seat member 37 when the portable multi-activity outdoor recreation apparatus 10 is deployed in the seatable position FIG. 3.

A wheeled means is securely mounted to the frame and includes an axle 25 conventionally mounted to and extending between the second ends 21, 24 of the first and second elongate wheel support members 19, 22 and further includes a pair of wheels 26, 27 mounted at the ends of the axle 25. An umbrella support insert member 47 is removably attached to the portable multi-activity outdoor recreation apparatus 10 with expandable straps 61, 62 when not in use. When in use the slot 49 of the umbrella support insert member 47 is disposed into the tubular umbrella support member 36 and a threaded rod 63 is placed through the hole 66 in the umbrella support insert member 47. Thus, the threaded rod 63 is designed for coupling to the frame and positioning to engage an umbrella 5 having a threaded connection portion 6.

A leg member 51 is securely and pivotally attached to the frame for supporting the portable multi-activity outdoor recreation apparatus upon the ground surface with the leg member 51 extending outwardly of the bottom side of the frame and resting against the leg brace member 57 and being disposed intermediate of the first and second elongate base members 11, 14. In addition, when the portable multi-activity outdoor recreation apparatus 10 is deployed in a seatable position FIG. 3, the first end portions 20,23 of the first and second elongate wheel base members 19, 22 extend outwardly of the bottom side of the frame and function as a leg to support the front portion of the portable multi-activity outdoor recreation apparatus upon the ground.

To use the portable multi-activity outdoor recreation apparatus 10 to transport equipment and downed game or to sleep upon the user can convert the portable multi-activity outdoor recreation apparatus 10 into a multiple use transporting device FIGS. 1 and 2 by aligning the holes 17 in the first and second elongate base members 11, 14 with the holes 17 in the first and second elongate wheel support members 19, 22 and securing the ends by placing fasteners 53 through the aligned holes 17 and securing the fasteners 53 with knob type handles 59, 60. The user then places the backrest member 35 on the top side of the frame, with the front side up and the backrest member 35 resting between the seat member 37 and the table member 38 and securing the backrest member 35 to the frame with an expandable strap 61. The strap members 50 and the expandable strap member 62 being used to secure downed game and equipment to the multiple use transporting device. In the alternative, the user can deploy the portable multi-activity outdoor recreation apparatus 10 in a seatable position with a table by removing the backrest member 35 from the frame and removably mounting it about the first curved end portions 31, 33 and further by pivoting the first and second wheel support members 19, 22 above and horizontally to the first and second elongate base members 11, 14 and securing the brace members 45 to the first and second elongate wheel support members 19, 22 with fasteners 53 and knob type handles 59 and still further by pivoting the table above and generally parallel to the first and second elongate base members 11, 14 and by extending the table support member 40 to rest upon the seat member 37 to support the table member 38. To carry the portable multi-activity outdoor recreation apparatus 10 the user pivotally places the first and second elongate wheel support members 19, 22 upon the first and second elongate base members 11,14 with the table member 38 pivoted to rest against the seat member 37 and the table support member 40 resting on the table member 38 and the backside of the backrest member 35 resting against the table member 38 and securing the unit with expandable straps. The strap members 50 being securely attached to the first and second elongate wheel support members 19, 22 and the handle member 18 and are used to carry the portable multi-activity outdoor recreation apparatus 10 when in the FIG. 4 position. When in the seatable and table position FIG. 3 the user can use the portable multi-activity outdoor recreation apparatus 10 as a comfortable seat with a backrest to sit upon while performing their activities and as a table for having a lunch, writing letters, or doing artistic work and a hunter using the table member 38 as an armrest to gain a steadier and longer aim when game is approaching.

As to further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principals of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A portable multi-activity outdoor recreation apparatus comprising:
   a frame having a top side, a bottom side, and first and second elongate base members, each of said first and second elongate base members having a first end and a second end, said first ends of said first and second elongate base members having curved portions, said curved portions being connected to each other;
   said frame including a handle member which is securely attached at said first ends of said elongate base members, said frame further including first and second elongate wheel support members each of which includes a first end portion and a second end portion, said first end portions having curved portions connected to each other;
   a means for supporting a person, downed game and equipment upon said portable multi-activity outdoor recreation apparatus including backrest support members securely mounted to cross members;
   a wheeled means mounted to said frame;
   an umbrella support member coupled to said frame;
   a leg member pivotally attached to said frame for supporting said portable multi-activity outdoor recreation apparatus upon a ground surface, said leg member extending outwardly of said bottom side of said frame and resting against a leg member brace and being disposed intermediate of said first and second elongate base members;
   said leg member brace being securely attached to said frame;
   said umbrella support member being tubular;
   an umbrella support insert member having a first end and a threaded hole extending through a second end of said umbrella support insert member;
   said first end of said umbrella support insert member being insertable into said umbrella support member; and
   a threaded rod, said threaded rod being selectively engageable to said threaded hole in said umbrella support insert member such that a distal end of said threaded rod is adapted for coupling to a threaded connection portion of an umbrella.

2. The portable multi-activity outdoor recreation apparatus as described in claim 1, further comprising:
   first end of said umbrella support insert member having a slot for facilitating positioning of said umbrella support insert member in said umbrella support member.

3. A portable multi-activity outdoor recreation apparatus comprising:
   a frame having a top side, a bottom side, and first and second elongate base members, each of said first and second elongate base members having a first end and a second end, said first ends of said first and second elongate base members having curved portions, said curved portions being connected to each other;
   said frame including a handle member which is securely attached at said first ends of said elongate base members, said frame further including first and second elongate wheel support members each of which includes a first end portion and a second end portion, said first end portions having curved portions connected to each other;
   a means for supporting a person, downed game and equipment upon said portable multi-activity outdoor recreation apparatus including backrest support members securely mounted to cross members;
   a wheeled means mounted to said frame;
   an umbrella support member coupled to said frame;
   a leg member pivotally attached to said frame for supporting said portable multi-activity outdoor recreation apparatus upon a ground surface, said leg member extending outwardly of said bottom side of said frame and resting against a leg member brace and being disposed intermediate of said first and second elongate base members;
   said leg member brace being securely attached to said frame;
   said frame further including a pair of said cross members, a first one of said pair of cross members being securely attached at said first ends of said first and second elongate base members, a second one of said pair of cross members being securely attached intermediate of said first and second elongate base members
   said first end portions of said elongate wheel support members being pivotally attached to said second end portions of said first elongate base member, said first end portion of said second elongate wheel support members being pivotally attached to said second end of said second elongate base member;
   said first and second elongate base members having a plurality of holes at said second ends and said first and second elongate wheel support have a plurality of holes at said first end portions thereof; and
   said means for supporting a person, downed game and equipment including a seat member being securely attached to said cross members;
   said backrest support members being securely attached to said cross members;
   one said cross member being securely attached to said first ends of said first and second elongate base members and one said cross member being securely attached intermediate of said first and second elongate base members;

a backrest member being removably attached to said frame;

a table member;

bracket members being securely attached to an underside of said table member and pivotally attached to said first and second elongate wheel support members;

an adjustable table support member being pivotally attached to said bracket members and said bracket members being securely attached to an underside of said table member; and said table support member being used to support said table member in a generally horizontal position when said portable multi-activity outdoor recreation apparatus is set up in a seatable position, and adjustable strap members with buckles being connected to said frame and said handle member and being used to carry said portable multi-activity outdoor apparatus in the carrying position and being used to secure downed game and equipment in the multiple use transporting position.

4. The portable multi-activity outdoor recreation apparatus as described in claim 3, further comprising:

each of said backrest support members having a curved first end portion; and said backrest support members being securely attached to said cross members and parallel to said first and second elongate base members.

5. The portable multi-activity outdoor recreation apparatus as described in claim 4, further comprising:

said first end portions being proximate to said handle member and extend outwardly of said top side of said frame.

6. The portable multi-activity outdoor recreation apparatus as described in claim 5, wherein said seat member is padded and is securely attached to said cross members and resting against said curved first end portions of said backrest support members.

7. The portable multi-activity outdoor recreation apparatus as described in claim 6, further comprising:

said backrest member further including backrest tubular support members which are securely attached to a backside thereof, said backrest tubular support members being adapted to removably fit about said first curved end portions of the said backrest support members.

8. The portable multi-activity outdoor recreation apparatus as described in claim 7, further comprising:

said backrest member being padded and removably attached with an expandable strap on said top side of said frame and resting between said table member and said seat member.

9. The portable multi-activity outdoor recreation apparatus as described in claim 8, further comprising:

said table member being padded and having a first and second end, said second end being securely attached to bracket members, said bracket members being pivotally attached at said second ends of said first and second elongate wheel support members.

10. The portable multi-activity outdoor recreation apparatus as described in claim 9, further comprising:

said table member being foldable upon said top side of said frame member.

11. The portable multi-activity outdoor recreation apparatus as described in claim 10, further comprising:

said table member including bracket members and a table cross brace member securely attached to an under side and near a first end thereof.

12. The portable multi activity outdoor recreation apparatus as described in claim 11, further comprising:

said adjustable table support member including a tubular member having an open end and being pivotally attached to said bracket members;

said adjustable table support member further including a shaft slidably and lockingly secured in said tubular member through an open end.

13. The portable multi-activity outdoor recreation apparatus as described in claim 12, further comprising:

said tubular member including a plurality of holes spaced therealong and extending through a wall thereof.

14. The portable multi-activity outdoor recreation apparatus as described in claim 13, further comprising:

said shaft including a rubberized foot member detachably mounted to an end of said shaft, said foot member being adapted to rest upon said seat member when said apparatus is deployed in a seatable and table position.

15. The portable multi-activity outdoor recreation apparatus as described in claim 14, further comprising:

said wheeled means including an axle mounted to and extending between said second ends of said first and second elongate wheel support members; and said wheeled means further including a pair of wheels mounted at ends of said axle.

16. The portable multi-activity outdoor recreation apparatus as described in claim 15, further comprising:

said leg member being disposed intermediate of said first and second elongate base members, said first end portions of said first and second elongate wheel support members extending outwardly of said bottom side of said frame at said second ends of said first and second elongate base members when said portable multi-activity outdoor recreation apparatus is deployed in a seatable position to function as a leg.

17. The portable multi-activity outdoor recreation apparatus as described in claim 16, further comprising:

said frame including brace members pivotally attached to said first and second elongate base members and being fastenably attached to said first and second elongate wheel support members when said apparatus is deployed in a seatable position, each of said brace members including a notch in a side and at an end thereof.

18. The portable multi-activity outdoor recreation apparatus as described in claim 3, further comprising:

said umbrella support member being tubular;

an umbrella support insert member having a first end and a threaded hole extending through a second end of said umbrella support insert member;

said first end of said umbrella support insert member being insertable into said umbrella support member;

a threaded rod, said threaded rod being selectively engageable to said threaded hole in said umbrella support insert member such that a distal end of said threaded rod is adapted for coupling to a threaded connection portion of an umbrella.

19. The portable multi-activity outdoor recreation apparatus as described in claim 18, comprising:

said first end of said umbrella support insert member having a slot for facilitating positioning of said umbrella support insert member in said umbrella support member.

20. A portable multi-activity outdoor recreation apparatus comprising:

a frame having a top side and a bottom side, first and second elongate base members each having a first end and a second end, said firsts ends having curved ends and being connected, a handle member which is securely attached at said first ends thereof, said frame member further including first and second elongate wheel support members each of which includes a first end portion and a second end, said first end portions having curved ends and being connected, said frame further including a pair of cross members one of which is securely attached at said first ends of said first and second elongate base members and another which is securely attached intermediate on said first and second elongate base members, said first end portions of said first elongate wheel support member being pivotally attached at said second end of said first elongate base member, said first end portion of said second elongate wheel support member being pivotally attached at said second end of said second elongate base member, said first and second elongate base members having a plurality of holes at said second ends, said first and second elongate wheel support members having a plurality of holes at said first end portions thereof, said frame including brace members pivotally attached to said first and second elongate base members and being fastenably attached to said first and second elongate wheel support members when said apparatus is deployed in a seatable position, each of said brace members including a notch in a side and at an end thereof;

a means for supporting a person, downed game and equipment upon said portable multi-activity outdoor recreation apparatus including a backrest member having a pair of backrest tubular support members and a backrest cross member securely attached to said backrest member and further including backrest support members securely attached to said cross members, said cross members being securely attached at first ends and intermediate said first and second elongate base members, each of said backrest support members having a first curved end portion and being parallel to said first and second elongate base members, said first curved end portions being proximate to said handle member and extending outwardly of said top side of said frame;

a backrest member being padded and having said backrest tubular support members and a said backrest cross member securely attached to a backside thereof, said backrest tubular support members being adapted to removably fit about said first curved end portions of said bracket support members;

a seat member being padded and securely mounted to said cross members and resting against said first curved end portions of said backrest support members;

a table member being pivotally attached with bracket members at said second ends of said first and second elongate wheel support members;

a table cross brace member being securely attached to an underside of said table member;

an adjustable table support member being pivotally attached to an underside of said table member for supporting said table in a generally horizontal position when said portable multi-activity outdoor recreation apparatus is set up in said seatable position, and strap members being connected to said frame and to said handle member and being used to secure said portable multi-activity outdoor recreation apparatus in a carry position and being used to secure downed game and equipment when said portable multi-activity outdoor recreation apparatus is set up in the multiple use transporting position, each of said backrest support members having a curved first end portion and being securely attached to said cross members and being parallel to said first and second elongate base members, said first curved end portions being proximate to said handle member and extending outwardly of said top side of said frame, said seat member being padded and being attached to said cross members and resting against said curved first end portions of said backrest support members, said backrest member being padded and further including backrest tubular support members which are securely attached to a backside thereof, said backrest tubular support members being adapted to removably fit about said first curved end portions of said backrest support members;

said backrest member being removably attached with expandable straps to said frame, said table member being padded and having a first end pivotally attached with bracket members at said second ends of said first and second elongate wheel support members, said table member being foldable upon said top side of said frame, said table member including bracket members and a table cross brace member attached to a back side and near a second end thereof, said adjustable table support member including a tubular member having an open end and being pivotally attached to said bracket members, and further including a shaft slidably and locking secured in said tubular member through said open end, said. tubular member including a plurality of holes spaced therealong and extending through a wall thereof, said shaft including a locking member attached thereto and also including a rubberized foot member detachably mounted to an end of said shaft, said foot member being adapted to rest upon said seat member when said apparatus is deployed in a said seatable position with a table;

a wheeled means mounted to said frame and including an axle mounted to and extending between said second ends of said first and second elongate wheel support members, and further including a pair of wheels mounted at ends of said axle;

an umbrella support insert member;

an umbrella support member being securely attached to a backside of said backrest member, said umbrella support insert member being removably insertable into said umbrella support member;

a threaded rod removably attached to said umbrella support insert member for coupling an umbrella to said frame;

a leg member pivotally attached to said frame for supporting said portable multi-activity outdoor recreation apparatus upon a ground surface, said leg member extending outwardly of said bottom side of said frame and being disposed intermediate of said first and second elongate base members, said first end portions of said first and second elongate wheel support members extending outwardly of said bottom side of said frame at said second ends of said first and second elongate base members when said portable multi-activity outdoor recreation apparatus is deployed in a seatable position to function as a leg.

* * * * *